United States Patent
Beach et al.

(10) Patent No.: US 7,524,547 B2
(45) Date of Patent: Apr. 28, 2009

(54) POWDER PRIMEABLE LOW MOISTURE SMC

(75) Inventors: Brian A. Beach, Detroit, MI (US); Brad Haskell, Lake Orion, MI (US); Michael J. Siwajek, Rochester Hills, MI (US); Probir K. Guha, Troy, MI (US)

(73) Assignee: Continential Structural Plastics, Inc., Troy, MI (US)

( * ) Notice: Subject to any disclaimer, the term of this patent is extended or adjusted under 35 U.S.C. 154(b) by 386 days.

(21) Appl. No.: 11/324,941

(22) Filed: Jan. 4, 2006

(65) Prior Publication Data

US 2006/0154000 A1 Jul. 13, 2006

Related U.S. Application Data

(60) Provisional application No. 60/643,282, filed on Jan. 12, 2005.

(51) Int. Cl.
*B32B 5/16* (2006.01)
*B32B 27/14* (2006.01)
*B32B 27/18* (2006.01)
*B32B 27/30* (2006.01)
*B32B 27/20* (2006.01)

(52) U.S. Cl. .............. 428/36.6; 428/36.7; 428/480; 428/482; 428/500; 525/55; 525/185; 524/445

(58) Field of Classification Search ............... None
See application file for complete search history.

(56) References Cited

U.S. PATENT DOCUMENTS

| | | | |
|---|---|---|---|
| 4,260,538 A | | 4/1981 | Iseler et al. |
| 4,491,642 A * | | 1/1985 | Atkins .................. 523/515 |
| 4,557,889 A * | | 12/1985 | Masuda et al. .............. 264/320 |
| 4,643,126 A | | 2/1987 | Wilkinson et al. |
| 5,021,297 A * | | 6/1991 | Rhue et al. ................ 428/430 |
| 5,100,935 A * | | 3/1992 | Iseler et al. ................ 523/514 |
| 5,202,366 A * | | 4/1993 | Reid et al. ................. 523/516 |
| 5,268,400 A | | 12/1993 | Iseler et al. |
| 5,294,233 A * | | 3/1994 | Kitahara et al. ............ 44/334 |
| 5,428,105 A * | | 6/1995 | McGarry et al. ............. 525/69 |
| 5,599,630 A * | | 2/1997 | Smith et al. ............... 428/413 |
| 5,854,317 A * | | 12/1998 | Rinz ....................... 523/508 |
| 5,869,557 A * | | 2/1999 | Landru et al. .............. 524/399 |
| 6,780,923 B2 * | | 8/2004 | Guha et al. ................ 524/539 |
| 6,841,607 B2 * | | 1/2005 | Twardowska-Baxter et al. ................... 524/445 |
| 6,887,931 B2 * | | 5/2005 | Twardowska et al. ........ 524/445 |
| 2007/0197694 A1 * | | 8/2007 | Guha et al. ................ 524/106 |

* cited by examiner

*Primary Examiner*—Vivian Chen
(74) *Attorney, Agent, or Firm*—Gifford, Krass, Sprinkle, Anderson & Citkowski, P.C.

(57) ABSTRACT

Sheet molding composition formulation includes a thermoset cross-linkable polymeric resin. A moisture reducing polymeric additive includes at least one of polystyrene; poly $C_1$-$C_4$ alykylmethacrylate; a copolymer of styrene with at least one of butadiene, acrylonitrile and vinyl chloride; or a combination of polystyrene, polyaklymethacrylate and or a styrene copolymer. Moisture reducing polymeric additive is present within the formulation from between 1 and 20 total weight percent. An article formed from such a sheet molding composition formulation defines an article shape and has a surface that sets the article shape with less than 0.5 total weight percent water after 96 hours exposure and 100° F. 100% humidity. The article shape is amendable to receiving a vapor barrier coating applied to the articles shape surface. A powder prime coating over lies the barrier coating and achieves surface finish results comparable to article shapes formed of steel.

22 Claims, 4 Drawing Sheets

POWDER PRIMEABLE LOW MOISTURE SMC

RELATED APPLICATION

This application is a non-provisional application that claims priority of U.S. Provisional Application 60/643,282 filed Jan. 12, 2005; the contents of which are incorporated herein by reference.

FIELD OF THE INVENTION

The present invention in general relates to SMC (Sheet Molding Compound) formulations and in particular to SMC having a low moisture content thereby making powder prime coating practical.

BACKGROUND OF THE INVENTION

Currently plastic body panels cannot be processed through conventional powder coating systems that are in place at automotive assembly plants without the result of a surface defect as shown in prior art FIG. 1 for a conventional class "A" SMC panel that has a smooth surface finish and a linear shrinkage of ±0.06%. The primer surface is the coating layer underlying color coat and clean coat. Primer surface coating applications are currently shifting towards powder systems to facilitate electrostatic primer coat application to a component. The plastic components currently represent poor powder coating substrates owing to moisture content that can exceed 0.9% component weight percent. This is unfortunate since plastic body panel components afford several attractive attributes over steel such as cost, resistance to corrosion and dents, and fuel savings. In order to render plastic components amenable to powder priming, powder deposition has conventionally been performed at elevated temperature, and inevitably decreasing coating efficient and promoting component sag.

Thus, there exists a need for a sheet molding compound having a low moisture content that facilitates room temperature vapor barrier coating as a precursor to powder primary.

SUMMARY OF THE INVENTION

Sheet molding composition formulation includes a thermoset cross-linkable polymeric resin has a linear shrinkage of ±0.06%. A moisture reducing polymeric additive includes at least one of polystyrene; poly $C_1$-$C_4$ alkylmethacrylate, a butadiene, saturated polyethylene, polyether, and a copolymer of styrene with at least one of butadiene, acrylonitrile and vinyl chloride; or a combination of thereof. Moisture reducing polymeric additive is present within the formulation from between 1 and 30 total weight percent and retains a linear shrinkage of the cured article of ±0.06%. An article formed from such a sheet molding composition formulation defines an article shape and has a surface that sets the article shape with less than 0.5 total weight percent water after 96 hours exposure and 100° F. at 100% humidity. The article shape is amendable to receiving a vapor barrier coating applied to the article shape surface. A powder prime coating overlies the barrier coating and achieves surface finish results comparable to article shapes formed of steel. The SMC formulation provided is especially well suited for the production of automotive body components.

DESCRIPTION OF THE INVENTION

Figure 1:
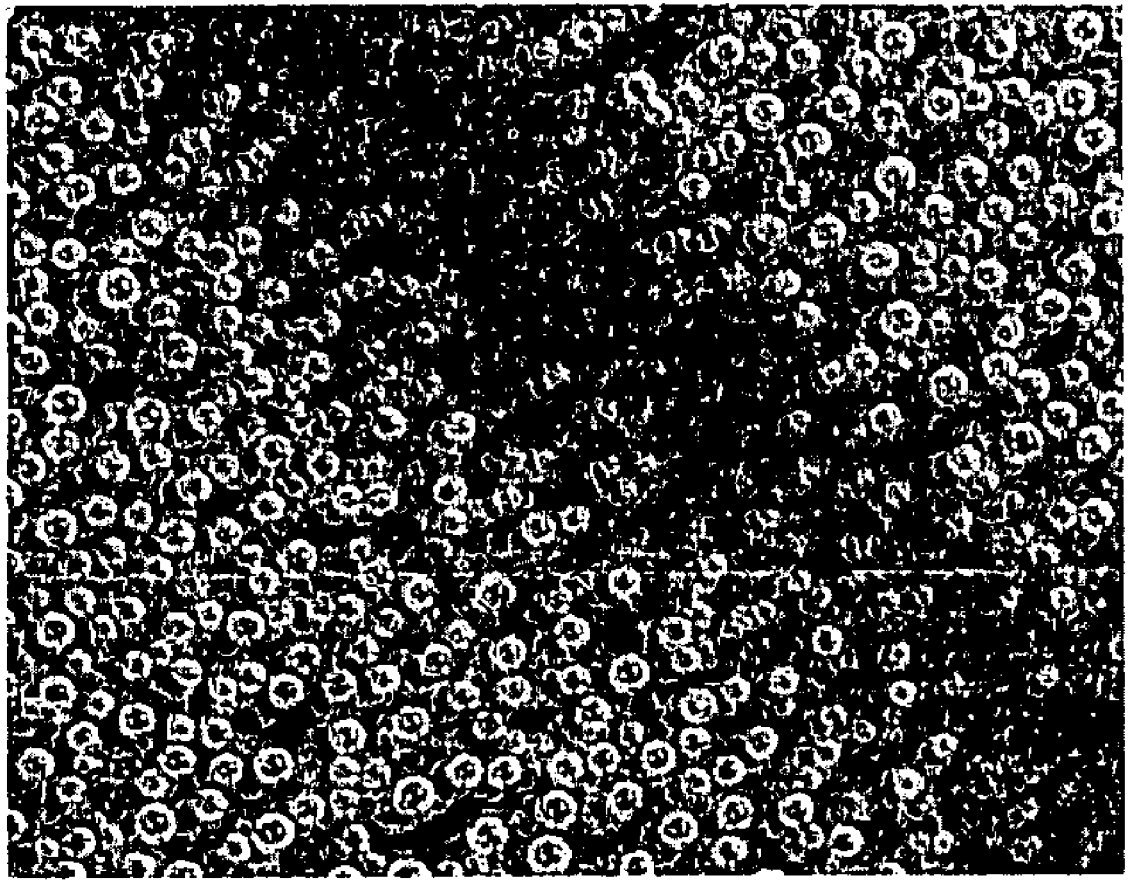
FIG. 1 is a photograph of appearance defect resulting on the surface of a prior art SMC produced by powder coating.

The present invention has utility as a molding compound with a moisture content that allows for vapor barrier coating and powder priming thereover to achieve a satisfactory surface painted article while maintaining a linear shrinkage of the article within ±0.06%. After extensive evaluations, it was found that the moisture content in the plastic substrate that is obtained on exposure to ambient atmospheric conditions is the primary cause of the surface defect in the powder coating of an SMC that has a linear shrinkage of ±0.06%. Therefore, the development of an SMC, a form of fiberglass reinforced plastic, that has a reduced water content compared to conventional SMC while maintaining the linear shrinkage absent the inventive addtive package affords the prospect of powder coating plastic panels even after exposure to humidified environments. According to the present invention SMC moisture content is reduced while maintaining surface profile characteristics through the addition to the formulation of a hydrophobic polymer, nanocomposite clay, or combination thereof.

As used herein "total weight percent" is intended to define a fully loaded molding composition inclusive of fillers and fibers.

An SMC formulation incorporating an inventive moisture reducing additive has several attractive attributes. A variety of base SMC formulations benefit from incorporation of a moisture-reducing additive is not critical so long as the base formulation has a linear shrinkage of ±0.06%. Base formulations suitable to incorporate a moisture-reducing additive without consideration of the linear shrinkage associated with the base SMC include those described in U.S. Pat. Nos. 4,260,538; 4,643,126; 5,100,935; 5,268,400; 5,854,317 and 6,780,923. Typical and preferred ranges of inventive SMC formulations are provided in Table 1.

TABLE 1

COMPONENTS AS PERCENTAGES OF FULLY FORMULATED INVENTIVE SMC HAVING A LINEAR SHRINKAGE OF ±0.06%

|  | Typical Total Weight Percent | Preferred Total Weight Percent |
|---|---|---|
| Reactants |  |  |
| Cross-linkable polymer (unsaturated polyester and/or vinyl ester resins) | 6-25 | 8-16 |
| Ethylenically unsaturated monomer (e.g. styrene) | 4-25 | 6-21 |

TABLE 1-continued

COMPONENTS AS PERCENTAGES OF FULLY
FORMULATED INVENTIVE SMC HAVING A
LINEAR SHRINKAGE OF ±0.06%

| | Typical Total Weight Percent | Preferred Total Weight Percent |
|---|---|---|
| Reaction Kinetic Modifiers | | |
| Free radical initiation (e.g. peroxide/peroxy ketals, or azo cmpds.) | 0-3 | 0.1-1 |
| Polymerization inhibitor (e.g. hydroquinone) | 0-2 | 0.1-1 |
| Additives | | |
| Mold release (e.g. stearate additive) | 0-5 | 1-3 |
| Low profile (non-moisture reducing) | 0-15 | 1-12 |
| Plasticizer | 0-3 | 0.1-0.5 |
| Flame retardant | 0-3 | 0.1-0.7 |
| Thickener | 0-5 | 0.5-2.5 |
| Colorants | 0-3 | 0.1-1 |
| Fillers | | |
| Particulate filler (e.g. calcium carbonate) | 0-80 | 30-60 |
| Fiber fillers (e.g. glass) | 0-80 | 5-50 |
| Moisture Reducing Additives | | |
| Total amount Including at least one of: | 1-30 | 4-14 |
| Polystyrene | 0-20 | 3-14 |
| Polymethylmethacrylate | 0-20 | 0-6 |
| Styrene co-polymer | 0-20 | 0-3 |
| Nanocomposite clay | 0-10 | 0-5 |

A principal component of an SMC formulation is a cross-linkable polymer resin such as an unsaturated polyester resin or vinyl ester resin. The prepolymer polymeric resin has a molecular weight on average of typically between 200 and 50,000 Daltons. The polyester prepolymer resins typically represent condensation products derived from the condensation of unsaturated dibasic acids and/or anhydrides with polyols. It is appreciated that the saturated di- or poly-acids are also part of the condensation process to form polyester prepolymers with a lesser equivalency of reactive ethylenic unsaturation sites.

Vinyl ester resins are also typically employed in SMC formulations as a polymeric resin. Vinyl ester prepolymer resins are typically the reaction product of an epoxy resin with a carboxylic acid having a single ethylenic unsaturation. Specific vinyl ester resins commonly used are the reaction product of epoxy functionalized bisphenol A with an acrylic acid. As a result of the difference in prepolymer synthesis, the vinyl ester resin prepolymers are typically associated with terminal ethylenic unsaturations while polyester resin prepolymers predominantly have ethylenic unsaturations internal to the prepolymer backbone.

The polymeric resin prepolymer is suspended, and preferably dissolved, in an ethylenically unsaturated monomer that copolymerizes with the resin during the thermoset process. Representative monomers illustratively styrene, vinyl toluene, divinyl benzene, acrylic acid esters and methacrylic acid esters, such as methylacrylate, ethylacrylate, n-butylacrylate, 2-ethylhexylacrylate, methylmethacrylate, pentaerythritol thiacrylate, ethyleneglycol dimethacrylate, diallyl maleate, diallyl fumarate, triallycyanurate, vinyl acetate, vinyl propionate, vinyl ether, acrylonitrile, and the like. It is appreciated that more than one type of monomer can be used in a molding composition. The monomer provides benefits including lower prepolymer viscosity and thermosetting without formation of a volatile byproduct.

A typical molding composition includes a free radical initiator to initiate cross-linking between the polymeric prepolymer resin with itself or with ethylenically unsaturated monomer, if present. A free radical initiator is typically chosen to preclude significant cross-linking at lower temperature so as to control the thermoset conditions. Conventional free radical polymerization initiators contain either a peroxide or azo group. Peroxides operative herein illustratively include benzoyl peroxide, cyclohexanone peroxide, ditertiary butyl peroxide, dicumyl peroxide, tertiary butyl perbenzoate and 1,1-bis(t-butyl peroxy)3,3,5-trimethylcyclohexane. Azo species operative herein illustratively include azobisisobutyronitrile and t-butylazoisobutyronitrile. While the quantity of free radical polymerization initiator present varies with factors such as desired thermoset temperature and decomposition thermodynamics, an initiator is typically present from 0 to 3 total weight percent.

In order to lessen cross-linking at temperatures below the desired thermoset temperature, a polymerization inhibitor is often included in base molding formulations. Hydroquinone and t-butyl catechol are conventional inhibitors. An inhibitor is typically present between 0 and 2 total weight percent.

The molding composition preferably includes a particulate filler. Particulate fillers operative in such molding compositions illustratively include calcium carbonate, calcium silicate, alumina, silica, talcs, dolomite, vermiculite, diatomaceous earth, glass spheres, graphite, metal and combinations thereof. Factors relevant in the choice of a particulate filler illustratively include filler cost, resultant viscosity of flow properties, resultant shrinkage, surface finish weight, flammability, electrical conductivity, and chemical resistance of the thermoset formulation. Particulate filler typically accounts from 0 to 80 weight percent. Typical filler sizes are from 0.1 to 50 microns.

A fiber filler is typically added to provide strength relative to a particulate filler. Fiber fillers operative herein illustratively include glass, carbon, polyimides, polyesters, polyamides, and natural fibers such as cotton, silk, and hemp. Preferably, the fiber filler is glass fiber in the form of chopped glass strands. Fiber fillers are typically present from 0 to 80 total weight percent.

A mold release agent is typically provided to promote mold release. Mold releases include fatty acid salts illustratively including oleates, palmitates, sterates of metal ions such as sodium, zinc, calcium, magnesium, and lithium. A mold release is typically present from 0 to 5 total weight percent.

It is appreciated that the present invention optionally also incorporates additional additives illustratively including plasticizers, flame retardants, thickeners, colorants, and other processing additives conventional to the art.

In addition to forming an article directly from a molding composition, it is appreciated that an inventive molding compound is readily penetrated onto various porous substrates illustratively including metal wire mesh.

Molding compositions of the present invention are well suited for the rapid production of molded composite material with less seasonal variation associated with humidity and molding temperature for the production of a variety of products illustratively including vehicle bumper beams, vehicle door panel components, vehicle floor components, vehicle spoilers, vehicle hoods, and various industrial and consumer product housings. Fibrous glass reinforcing materials operative in the present invention illustratively include chopped strand, matte, continuous strand, surfacing matte, glass cloth and roving cloth. It is also appreciated that other non-silaceous reinforcing fibrous materials are also operative herein illustratively including natural fibers, aramid fibers, carbon fiber, each alone, or in combination with glass fibers.

A moisture-reducing additive is provided to lower the moisture content of an SMC under atmospheric exposure. It is appreciated that an inventive moisture-reducing additive preferably also has low profile additive attributes including improving surface properties and dimensional stability of a resulting molded product. A moisture-reducing additive illustratively includes polystyrene, poly $C_1$-$C_4$ alkylmethacrylate, a butadiene, saturated polyethylene, polyether, and a copolymer of styrene with at least one of butadiene, acrylonitrile and vinyl chloride; or a combination of thereof. Specific examples of copolymers include the styrene/butadiene copolymer sold under the trade name Kraton®, Acrylonitrile-Butadiene-Styrene Copolymers, 2-hydroxyethyl methacrylate/styrene copolymers methacrylate/butadiene/styrene copolymers), MS (methylmethacrylate/styrene copolymers), and T-ABS (transparent acrylonitrile/butadiene/styrene. Typically, an inventive moisture reducing additive as a single polymer or as a package of polymers is present from 1 to 30 total weight percent with still maintaining a linear shrinkage of ±0.06%. Preferably, the moisture reducing additive as a single polymer or as a package of polymers is present from 4 to 14 total weight percent.

While polystyrene, polymethyl methacrylate, and a styrene copolymer each as an individual and separate moisture-reducing additive added to a given base SMC composition at a 3.5% total weight percent loading renders the resulting SMC amenable to receiving a vapor barrier coating as a precedent to successful powder priming (see FIG. 3), it is appreciated that component metrics such as surface roughness, shrinkage, and extension characteristics are attached by a greater extent with a single component moisture reducing additive. As such in order to maintain component metrics a combination of inventive moisture reducing additives are used even though such a combination may result in a net moisture content higher than a single moisture reducing additive. By way of example, a moisture reducing additive package that affords a moisture content of less than 0.5% addition after 96 hours at 100° F. (100% humidity) and retains class "A" surface finish and shrinkage includes polystyrene, a poly $C_1$-$C_4$ alkylmethacrylate, and a copolymer of styrene with butadiene, acrylonitrile, vinyl chloride, or a combination thereof. Owing to cost and commercial availability polymethylmethacrylate represents a preferred poly $C_1$-$C_4$ alkylmethacrylate. A combined moisture reducing additive package preferably includes polystyrene as the principal fraction even though in a three or more fraction package polystyrene does not necessarily constitute a majority (>50 weight percent) of the moisture reducing additive package. A three component moisture reducing additive package includes on a weight ratio basis polystyrene:poly methylmethacrylate:styrene copolymer of 1:0.3-0.9:0.1-0.5 and more specifically a greater quantity of poly $C_1$-$C_4$ alkymethacrylates and styrene copolymers afford both a degree of moisture reduction and low profile attributes, while polystyrene provides moisture reduction with nominal profile improvement attributes.

A nanocomposite clay is lipophilic and has domains of a size that do not ad to the molded article surface roughenss. Clay domains are on the order of 50 to 150 nanometers and have a platelet thickness of one to 10 nanometer and are optimally used alone, or in combination with a polymeric moisture reducing additive to enhance the processibility on inventive SMC formulation while decreasing the absorption rate. Such nanocomposite clay is typically present up to 10 total weight percent.

It is appreciated that other low profile additives lacking a moisture reducing property are also present. Such additives include a variety of thermoplastics and elastomers that are responsible for the limited linear shrinkage associated with a base formulation. Low profile additives are typically present from 0 to 15 total weight percent and more often from 1 to 12 total weight percent of the SMC, with the nature of additive and the resulting linear shrinkage dictating the amount.

Figure 2:
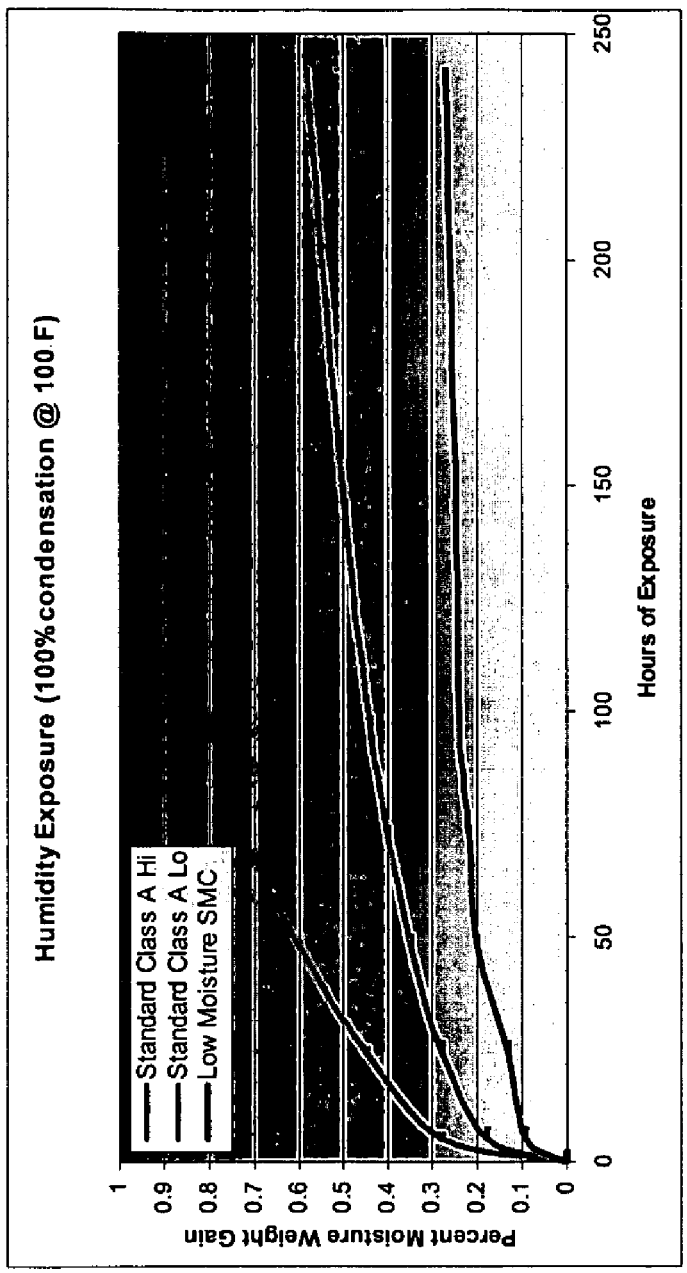
FIG. 2 is a graph of moisture weight gain as a function of time in a 100% humidity at 100° F. environment for an inventive low moisture SMC compared to conventional prior art SMC formulations.

As shown in FIG. 2, significant reductions in moisture content have been achieved by the present invention relative to conventional SMC formulations that have a range of moisture contents under production conditions ranging from "high" to "low".

Figure 3:
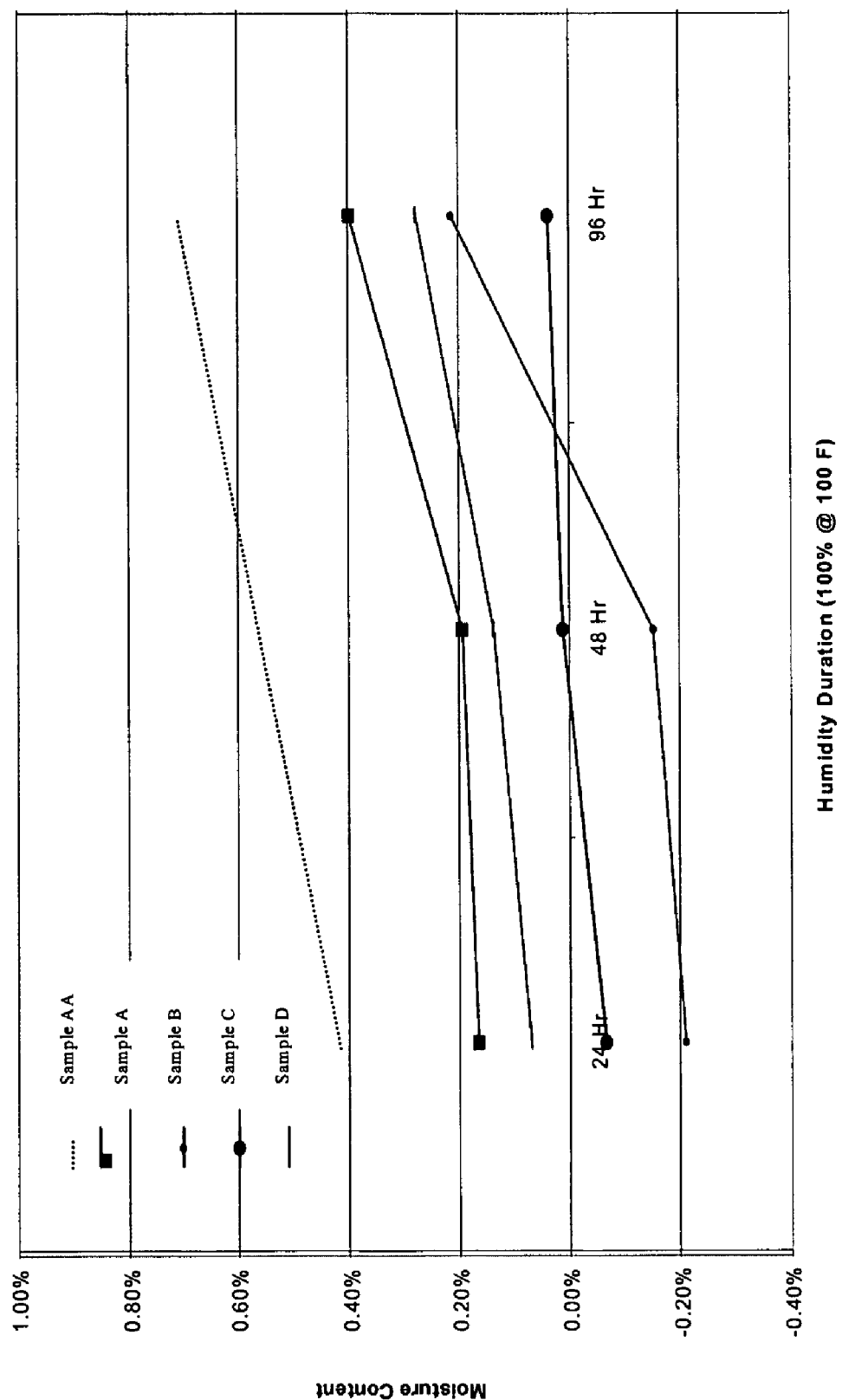
FIG. 3 is a graph of moisture weight gain as a function of time in a 100% humidity at 100° F. environment for a base SMC with different moisture modifying additives present at 3.5 total weight percent, where A is the comparative prior art SMC, B is polystyrene, C is polymethylmethacrylate, and D is Kraton® Blend butadiene/styrene copolymer.

As shown in FIG. 3, all of the formulations that were tested used the Tough Class "A" SMC resin system that has a linear shrinkage of ±0.06%, containing unsaturated polyester resin, thermoplastic additives, organic peroxides, inhibitor, filler, mold release, and pigment sold by ThyssenKrupp Budd under the trade name TCA® (Sample AA) and a non-class "A" variant identified herein as Sample A. These base formulations serve as controls. Each of the individual thermoplastics was tested at a loading of 3.5 total weight. Polystyrene (Sample B), polymethylmethacrylate (Sample C) and Kraton® butadiene/styrene copolymer (Sample D) moisture-reducing additives each decreases moisture levels sufficiently relative to the controls A and AA, to allow for successful powder priming of the resulting SMC surface. In a preferred embodiment, a moisture-reducing additive is present from 1 to 12 total weight percent of the SMC formulation.

The present invention is further illustrated with respect to the following non-limiting examples where percentages are total weight percent of a filler loaded SMC formulation unless otherwise noted.

EXAMPLE 1

Linear shrinkage of a molded article is measured according to the present invention by the following procedure: Mold resin matrix without fiber filler in a tool with the length measurement calibrated. Let molded plaque condition at room temperature for 24 hours. Measure the length of the plaque versus the tool length to obtain the % growth or shrink.

EXAMPLE 2

Sample A (control SMC formulation), Sample B (control+3.5% polystyrene), Sample E (control+1.75% polystyrene, 1.31% polymethylmethacrylate and 0.43% butadiene/styrene copolymer), and Sample G (control+1.75% polystyrene, 0.87% polymethylmethacrylate and 0.87% butadiene/styrene copolymer) are prepared as test panels. The panels are baked in a convection oven at 300 degrees Fahrenheit for one hour and weighed on an analytical balance. The panels are placed in a humidity chamber maintained at 100% relative humidity at 100° F. for 16 hours. After blowing off moisture from the panels with an air gun the panels are re-weighed on the analytical balance. The results of the hydration study are shown in Table 2.

The SMC test panels A and E are overcoated with a vapor barrier coating characterized as being highly cross-linked and having a hydrophobic backbone relative to conventional melamine barrier coating. After the vapor barrier coat is applied the SMC panel is powder coated. The bubbling of FIG. 1 is observed for the panel corresponding to Sample A while the Sample E panel does not show bubbling.

TABLE 2

Hydration study results.

| Sample | Moisture reducing Additive package | Wt initial (gms) | Wt final (gms) | Delta | Water Wt Gain % |
|---|---|---|---|---|---|
| AA | None | 37.27 | 37.47 | 0.20 | 0.50 |
| AA | None | 37.74 | 7.99 | 0.25 | 0.66 |
| B | 3.5 wt % polystyrene | 87.71 | 87.84 | 0.13 | 0.15 |
| B | 3.5 wt % polystyrene | 88.33 | 88.51 | 0.18 | 0.20 |
| E | 1.75% polystyrene 1.31% polymethylmethacrylate 0.44% butadiene/styrene copolymer | 53.21 | 53.29 | 0.08 | 0.15 |
| G | 1.75% polystyrene 0.87% polymethylmethacrylate 0.87% butadiene/styrene copolymer | 51.13 | 51.25 | 0.12 | 0.23 |
| G | | 50.24 | 50.36 | 0.12 | 0.24 |

EXAMPLE 3

Figure 4:
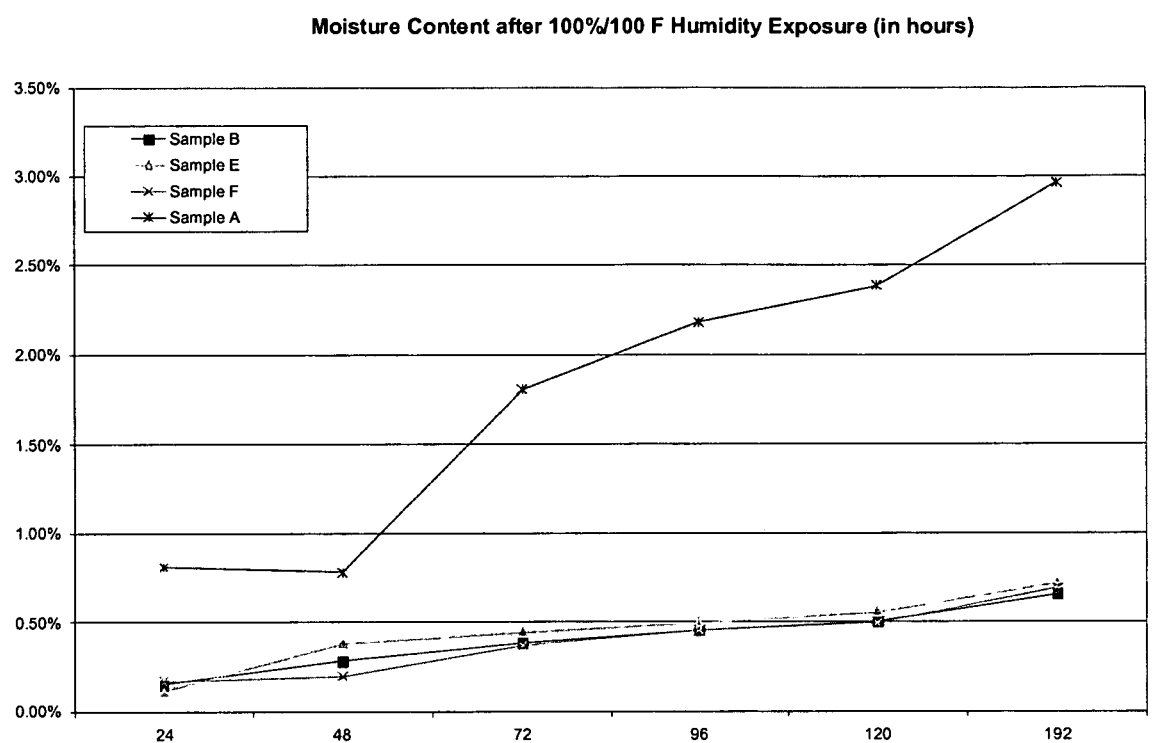
FIG. 4 is a graph of moisture content as a function of time (in hours) in a 100% humidity at 100° F. environment for inventive low moisture SMCs relative to control SMC A, sample B of FIG. 3, Sample E is the comparative prior art SMC with 1.75 wt. % polystyrene, 1.31 wt. % polymethylmethacrylate, and 0.43 wt. % butadiene/styrene copolymer, and Sample F is Sample E with the addition of 3.5 total weight percent of a nanophase alkylammoniated bentonite clay.

The procedure of Example 2 is repeated with the addition of nanocomposite alkyl quaternary ammonium bentonite clay (Cloisite® 10A, Southern Clay Products) to Sample E in order to determine the effect on the moisture permeation rate (Sample F). As shown in FIG. 4, sample F shows an overall decrease in the moisture absorption especially in the 0 to 72 hour critical zone upon addition of 3.5 total weight percent of this clay to the composition of Sample E. Hydrations tests are also repeated for Samples A, B, and E. The results for these samples are also plotted in FIG. 4 as a function of time. Sample F yielded a smooth surface and is thereafter overcoated with the vapor barrier coating and powder coated per Example 2, surface bubbles observed in FIG. 1 are not detected for Sample F (not shown).

EXAMPLE 4

The procedure of Example 2 is repeated with the addition of 4.8% polystyrene 3.6% polymethylmethacrylate, and 1.3% styrene-acrylonitrile copolymer to the control SMC formulation (Sample A). The hydration study showed an average humidity content increase at 96 hours of 0.15%, with the retention of a linear shrinkage rate of ±0.06%.

References recited herein are indicative of the level of skill in the art to which the invention pertains. These references are hereby incorporated by reference to the same extent as if each individual reference was explicitly and individually incorporated herein by reference.

The invention claimed is:

1. A sheet molding composition formulation comprising:
   a thermoset cross-linkable polymeric resin having a linear shrinkage rate of ±0.06%; and
   a moisture reducing polymeric additive selected from the group consisting of: polystyrene; poly $C_1$-$C_4$ alkylmethacrylate; butadiene; polyether; and a copolymer styrene with at least one of butadiene, acrylonitrile, and vinyl chloride; and a combination thereof, said additive being present between 1 and 30 total weight percent and that retains the linear shrinkage rate of ±0.06%;
   wherein the formulation has a water content after 96 hours at 100° Fahrenheit at 100% humidity of less than 0.5 total weight percent.

2. The formulation of claim 1 wherein said moisture reducing additive comprises polystyrene.

3. The formulation of claim 1 wherein said moisture reducing additive is present from 3 to 30 total weight percent and consists of polystyrene present from 3 to 14 total weight percent and at least one optional moisture reducing additive selected from poly $C_1$-$C_4$ alkylmethacrylate, butadiene, polyether, and said copolymer.

4. The formulation of claim 1 wherein said additive is present from 3 to 14 total weight percent.

5. The formulation of claim 1 wherein said moisture reducing additive comprises polystyrene and at least one of poly $C_1$-$C_4$ alkylmethacrylate, butadiene, polyether, and said copolymer, where polystyrene is a principal fraction of said additive.

6. The formulation of claim 1 further comprising an ethylenically unsaturated monomer.

7. The formulation of claim 1 wherein said additive is on a weight basis ratio polystyrene: poly $C_1$-$C_4$ alkylmethacrylate: styrene copolymer 1:0.3-0.9:0.1-0.5 and said additive is present from 3 to 20 total weight percent of the formulation.

8. The formulation of claim 7 further comprising a nanocomposite clay.

9. The formulation of claim 1 wherein said additive comprises a poly $C_1$-$C_4$ alkylmethacrylate.

10. The formulation of claim 1 wherein said additive comprises a styrene copolymer.

11. The formulation of claim 1 further comprising a nanocomposite clay.

12. A powder primed article comprising:
    a sheet molding formulation of claim 1 defining an article form and having a surface wherein the form gains less 0.5 total weight percent water after 96 hours exposure to 100 degree Fahrenheit at 100% humidity;
    a vapor barrier coating applied to the surface; and
    a powder prime coating overlying said barrier coating.

13. The article of claim 12 further comprising a nanocomposite clay incorporated within the sheet molding formulation.

14. The article of claim 12 wherein said sheet molding formulation comprises polystyrene.

15. The article of claim 12 wherein said sheet molding formulation comprises polystyrene.

16. A vehicle body component formed from a sheet molding composition formulation comprising:
    a thermoset polymeric resin cured into a form and having a linear shrinkage rate of ±0.06% containing a moisture reducing polymeric additive selected from the group consisting of: polystyrene; poly $C_1$-$C_4$ alkylmethacrylate; butadiene; polyether; and a copolymer styrene with at least one of butadiene, acrylonitrile, and vinyl chloride; and a combination thereof, said additive being present between 1 and 30 total weight percent and that retains the linear shrinkage rate of ± 0.06%;
    wherein the formulation has a water content after 96 hours at 100° Fahrenheit at 100% humidity of less than 0.5 total weight percent.

17. The automotive body component of claim 16 wherein the form is a vehicle bumper beam.

18. The automotive body component of claim 16 wherein the form is a vehicle door panel component.

19. The automotive body component of claim 16 wherein the form is a vehicle floor component.

20. The automotive body component of claim 16 wherein the form is a vehicle spoiler.

21. The automotive body component of claim 16 wherein the form is a vehicle hood.

22. The automotive body component of claim 16 wherein the form gains less 0.5 total weight percent water after 96 hours exposure to 100 degree Fahrenheit at 100% humidity and further comprising a vapor barrier coating applied to the form; and
a powder prime coating overlying said barrier coating.

* * * * *